(12) United States Patent
Avganim (10) Patent No.: US 11,859,413 B2
(45) Date of Patent: Jan. 2, 2024

(54) SECURITY STRIP DEFINING A SECURITY SLOT AND ATTACHABLE TO MOBILE ELECTRONIC DEVICES

(71) Applicant: Meir Avganim, Gealya (IL)

(72) Inventor: Meir Avganim, Gealya (IL)

(*) Notice: Subject to any disclaimer, the term of this patent is extended or adjusted under 35 U.S.C. 154(b) by 789 days.

(21) Appl. No.: 16/941,591

(22) Filed: Jul. 29, 2020

(65) Prior Publication Data
US 2021/0032908 A1 Feb. 4, 2021

Related U.S. Application Data (60) Provisional application No. 62/882,103, filed on Aug. 2, 2019.

(51) Int. Cl.
*E05B 73/00* (2006.01)

(52) U.S. Cl.
CPC ................ *E05B 73/0082* (2013.01)

(58) Field of Classification Search
CPC .................................................. E05B 73/0082
See application file for complete search history.

(56) References Cited

U.S. PATENT DOCUMENTS

| | | | |
|---|---|---|---|
| 5,493,878 A | 2/1996 | Murray, Jr. et al. | |
| 5,502,898 A | 4/1996 | Manore | |
| 6,244,082 B1* | 6/2001 | Avganim | E05B 73/0005 70/57 |
| 7,850,013 B1* | 12/2010 | Kramer | H05K 7/186 70/DIG. 64 |
| 7,971,458 B2* | 7/2011 | Gilbert | E05B 73/0082 248/552 |
| 9,476,229 B2* | 10/2016 | Avganim | E05B 73/0082 |
| 2012/0008277 A1* | 1/2012 | Wang | G06F 1/1616 361/679.01 |
| 2012/0217371 A1* | 8/2012 | Abdollahzadeh | G08B 13/1463 248/551 |
| 2013/0180295 A1* | 7/2013 | Avganim | E05B 73/0082 70/58 |
| 2014/0238091 A1* | 8/2014 | Allen | E05B 73/0082 70/58 |
| 2014/0366593 A1* | 12/2014 | Avganim | E05B 73/0005 70/58 |

(Continued)

*Primary Examiner* — Mark A Williams
(74) *Attorney, Agent, or Firm* — OSTROLENK FABER LLP (57) ABSTRACT

A security strip defining a security slot and attachable to a mobile electronic device has a strip body shaped as a flat and thin, strip-shaped component with a length, a width and a thickness dimension, wherein the length of the strip body is at least ten times the thickness dimension of the strip body. Screw holes enable screwing the strip body to an underside of the mobile electronic device. A security slot body protrudes from the strip body and has a thickened portion thicker than the thickness dimension of the strip body and defining therein a security slot in which a locking element of a locking device is receivable, the security slot body extending along the one of the side walls of the mobile device. The security strip includes at least one cutout that enables the security strip to extend generally in line of one of the front and rear legs of the mobile device so that at least one of the front or rear legs is at least partially locatable in the at least one cutout in the strip.

11 Claims, 8 Drawing Sheets

(56) References Cited

U.S. PATENT DOCUMENTS

2015/0147109 A1* 5/2015 McCarter, Jr. ......... F16M 13/00
 403/164
2021/0008691 A1* 1/2021 Angott ................... B25B 5/166

* cited by examiner

SECURITY STRIP DEFINING A SECURITY SLOT AND ATTACHABLE TO MOBILE ELECTRONIC DEVICES

CROSS-REFERENCE TO RELATED APPLICATION

The present non-provisional patent application claims the benefit of and priority to U.S. Provisional Patent Application No. 62/882,103, filed Aug. 2, 2019, by Meir Avganim, and entitled "SECURITY STRIP DEFINING A SECURITY SLOT AND ATTACHABLE TO MOBILE ELECTRONIC DEVICES," the entire contents of which are incorporated herein by reference.

BACKGROUND OF THE INVENTION

The present invention is generally directed to security systems for light, mobile electronic devices and, more particularly, to a security strip which is attachable to the bottom of a mobile device and/or to glue-on sticks which define a security slot therein.

In laptop, notebook and the modern iPad® and tablet devices, it has become almost standard to provide a security slot into which a locking element can be inserted, which allows tethering of the mobile device to an immovable object, such as to a chair or a desk, to prevent theft of the mobile device. The standard security slot is a 3×7 mm throughgoing hole, into which a T-shaped locking bar is inserted and rotated inside the slot and so locks the mobile device to the immovable object. The prior on this type of lock is quite extensive and exemplified by U.S. Pat. Nos. 6,244,082, 5,502,898, and 5,493,878 the contents of which are incorporated herein by reference. Also incorporated by reference are the contents of U.S. Pat. No. 9,476,229 of the present inventor.

More recently, the thicknesses of mobile devices, for example, the Apple notebook and tablets have become so thin, that it is not possible or practical to provide the standard security slot therein because the lock body is thicker than the tablet.

It is a primary objective of the present invention to address the issue of very thin mobile devices, including notebooks, iPads®, tablets, and mobile telephone devices which require securing against theft.

Initially, for purposes of background information, the description of prior art FIGS. 1 through 9 is repeated herein, literally repeating the description from the instant inventor's aforementioned U.S. Pat. No. 9,476,229. Thus, referring to FIG. 1, a thin, strip-like component 10 has a body 12 which measures approximately 14 inches in length, less than an inch in width and approximately a millimeter in thickness. The body 12 of the locking strip 10 is provided with short legs 16a and 16b and attaching screw holes 14a, 14b, 14c and 14d, which are beveled on the screw receiving side. The screws are inserted into the screw holes 14a, 14b, 14c and 14d, and the strip 10 can be connected to the bottom of a mobile device, such as a notebook. The notebook will then rest, slightly elevated, on the round legs 16a, 16b, slightly lifting the rear of the notebook.

Figure 1:
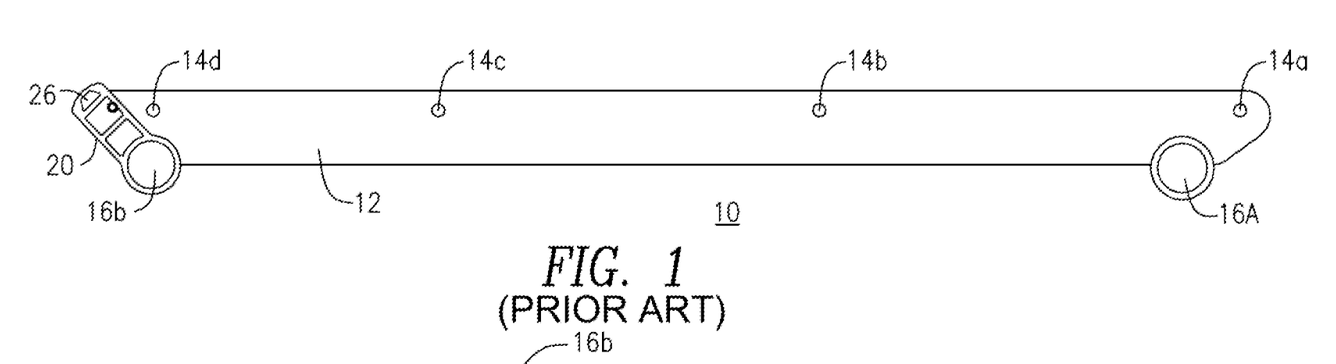
FIG. 1 (prior art) shows a plane view of a long, ruler-like strip in accordance with a first embodiment of the invention.
Figure 2:
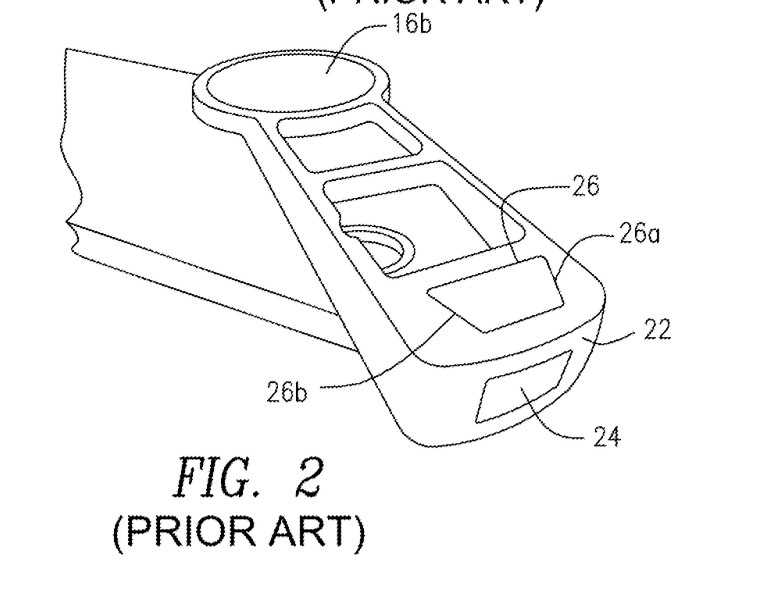
FIG. 2 (prior art) is a perspective of one of the end regime of the strip of FIG. 1, which defines the security slot.

Of particular significance herein, is the provision at one side of the strip 10, of a security slot defining body 20 which, as shown in FIG. 2, grows gradually in thickness from one side to the other side of the strip body 12. At the wide side is defined a security slot 24 in the surface 22, into which a conventional locking element can be inserted. The security slot 24 is accessible through an opening 26, through which it can be seen that the slot has sidewalls 26a and 26b, which provide the interior with a trapezoidal shape.

In operation, the strip 10 is connected by screws to the underside of a mobile device, which can be any device to which it is configured to be attached, by providing screw holes corresponding with the position of the screw openings 14a, 14b, 14c and 14d and thereby be secured to it via special screws that are not easily removed, for example one-way closure.

In well-known manner, a lock with a cable (FIG. 7) which has a loop 82 at the end is inserted into the security slot 24, and thereby securing the mobile device.

Figures 3, 4, 5, 6, 7:
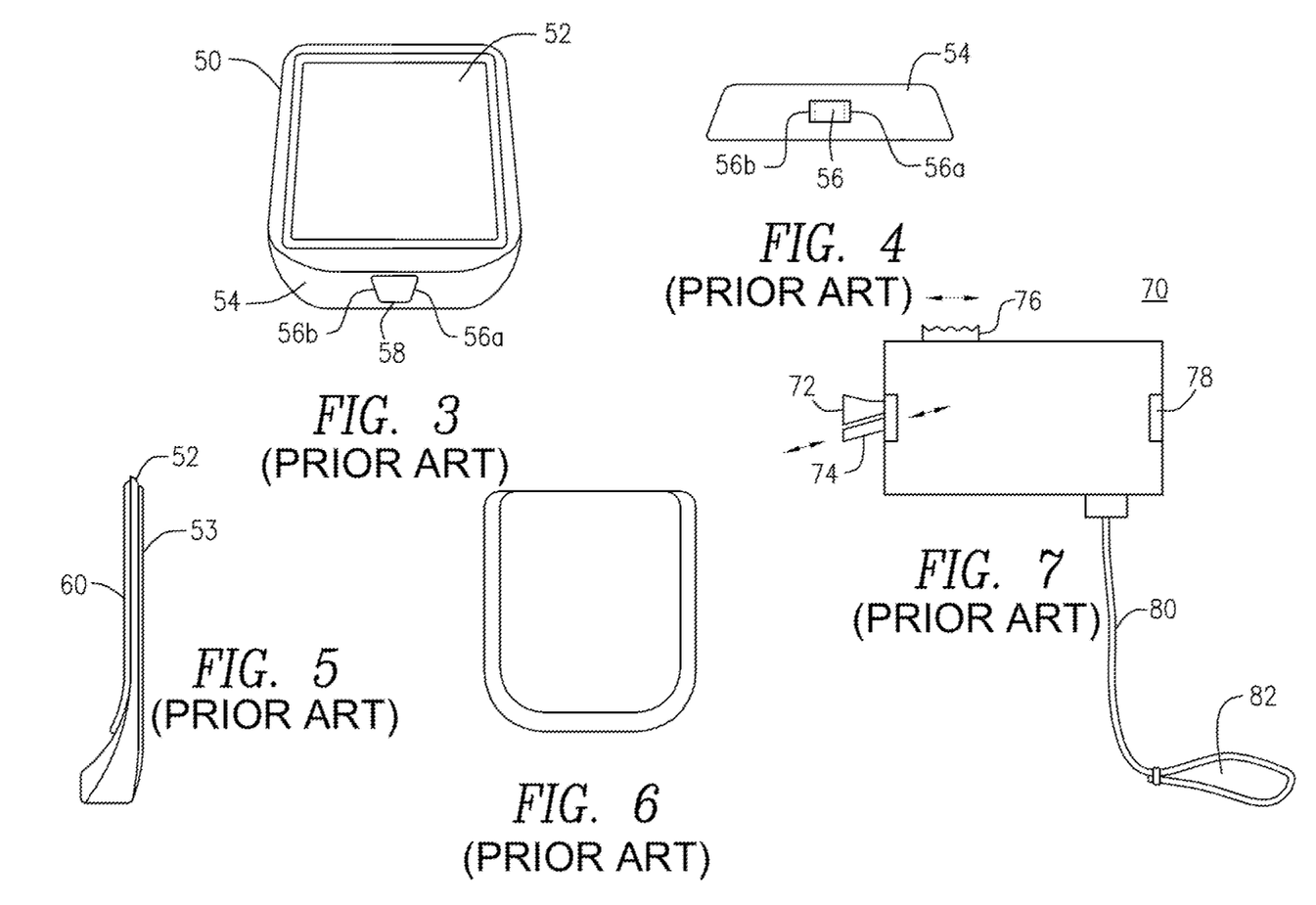
FIG. 3 (prior art) shows one side of a stick-on, plate-like device which defines the security slot and which can be glued to the underside of either a mobile device, or to the docking station or cover thereof.
FIG. 4 (prior art) is an end view of FIG. 3.
FIG. 5 (prior art) is a side view of FIG. 3.
FIG. 6 (prior art) is a rear view of FIG. 3.
FIG. 7 (prior art) shows one type of a lock that can be used with the security slot of the foregoing embodiments.

In FIG. 3 is shown a small, tab-like, generally flat, rectangular body 50 which is designed to be a stick-on security slot forming body. The stick-on device 50 has a body that is generally flat and preferably measures an inch and a half to two inches in width and length and has a thickness on the order of about a millimeter. Provided on the invisible surface is a stick-on device 60 (FIG. 5), the cover of which can be peeled away, and thereby allowing attaching the stick-on lock defining security slot forming body to the underside of the mobile device.

At one end, the generally flat body 50 increases in thickness to a thickness of around 10 mm and that section defines a security slot 56 with rectangular opening and tapering walls 56a and 56b. Inside, the slot has sidewalls 56a and 56b, which are visible through the viewing access opening 58. See FIGS. 3-5.

Referring to FIG. 7, the lock 70 has a rectangular lock body, measuring approximately 18×30 mm in width and length and approximately 7 mm in thickness, has a stationary locking element 72, which fits in the opening 56 and which can be locked therein by sliding the locking pin 74 by moving the slider button 76. Once the locking elements 72 and 74 combine inside the locking slot 58, it is impossible to withdraw the lock, which remains securely connected to a cable 80 and has a loop 82, in well-known manner. The numeral 78 indicates the key insertion location.

In departure from the prior art, and as indicated in the previously mentioned incorporated by reference patent application, the size of the opening 56 at its narrowest point at the opening, may measure less than 5 mm, which is an improvement over the 3×7 mm standard slot size. Also, the hole may be a blind hole and the locking elements 72 and 74, once inserted, cannot be rotated inside the opening. Instead, owing to the overall trapezoidal shape, they hug and hold inside against the trapezoidal shape of the opening itself.

The device 50 can be attached to nowadays familiar covers that have been provided for notebooks, cell phones and the like, and such devices can be provided with an undercut area which fits the overall dimension of the device 50 and which, when attached to that undercut area, will not protrude at the bottom of the device outside the general flat area of the body itself.

Figure 8:
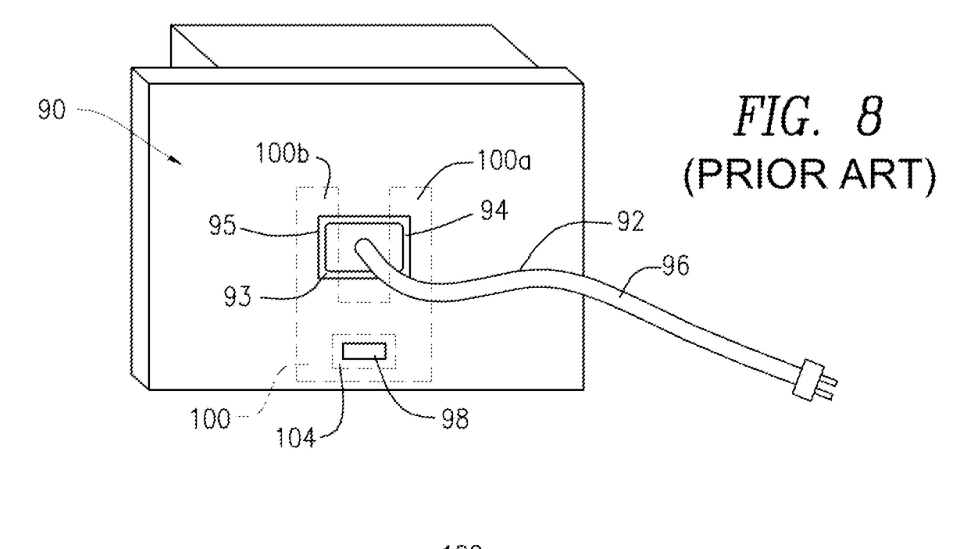
FIG. 8 (prior art) is a rear view of an existing equipment comprising a security slot.

FIG. 8 shows the rear of a prior art conventional device 90 which has a rear wall 91 with an opening 93 for the insertion therethrough of electrical cable or cables 92 that have an elongated cord 96 that is connected at a distal end to a plug 94 that fits in the rear socket 95 of the device 90.

The rear surface is also provided with a standard security slot, typically at 3×7 mm rectangular slot shown below the opening 93.

As is known in the art, in the prior art device 90, in order to open the rear cover of the device 90, it is necessary to first remove the cable 92. If the cable cannot be removed, the rear wall cover cannot be opened.

Figure 9:
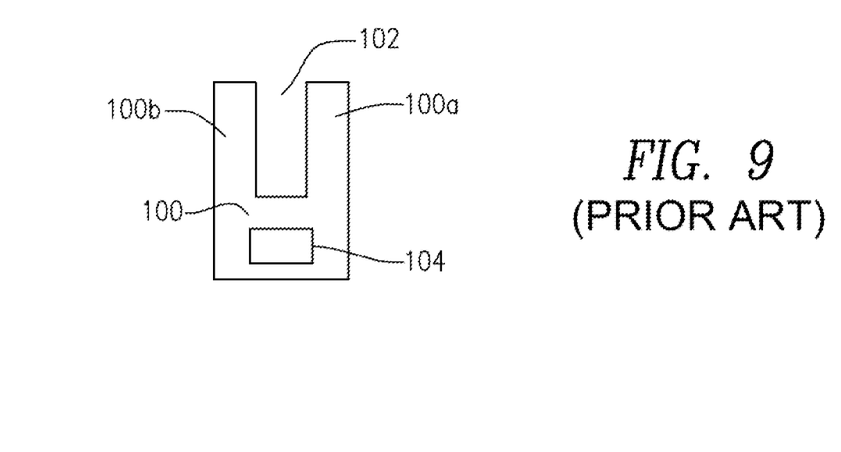
FIG. 9 (prior art) is a security device operable with the prior art device of FIG. 8.

In accordance with the present invention, and with reference to FIG. 9, the invention provides a security cover plate 100 that is generally yoke shaped at the top with arms 100a and 100b and a yoke opening 102. The plate 100 also has a slightly oversized 3×7 mm opening 104. Merely placing the cover plate 100 at the rear of the prior art device 90, allows the legs 100a and 100b to grasp the rear of the cable plug 94 while registering its opening 104 over the security slot 98. When the locking element 72/74 of FIG. 7 or a similar T-shaped bar locking element is inserted through the openings 104 and security slot 98, the security plate 100 cannot be removed. Not only can the device 90 not be removed but also the rear plug cannot be pulled out and no access can be gained to the interior of the device 90.

The present invention provides two styles of strips or stick-on components that can be secured to the mobile devices, and which define a security slot which is capable of receiving either the prior art standard 3×7 mm slot locks, or the thinner, more flat locks of the present inventor that are described in the aforementioned U.S. Pat. No. 9,476,229 of the present inventor.

SUMMARY OF THE INVENTION

It is an object of the present invention to provide a security strip which can be placed underneath a very thin tablet or notebook device to define at one end thereof a standard security slot into which a locking element can be inserted to tether the mobile device requiring protection.

It is further an object of the invention to provide a stick-on tab which can be adhered to the underside of the tablet or mobile device requiring to be secured against theft and which defines for the device a standard security slot.

It is a further object of the present invention to provide a security plate which can be placed over a standard security slot while having extending arms or legs that also engage the power plug or similar plus on a device which prevents its removal.

In preferred embodiments, the security strip defines a security slot and is attachable to a mobile electronic device that has rear legs located closer to a rear side of the mobile electronic device and front legs closer to a front side thereof, the legs serving to elevate the mobile device above a resting surface thereof, the mobile device including a left sidewall and right side wall. The security strip comprises a strip body shaped as a flat and thin, strip-shaped component with a length, a width and a thickness dimension, wherein the length of the strip body is at least ten times the thickness dimension of the strip body; screw holes defined along the length of the strip body for enabling screwing the strip body to an underside of the mobile electronic device; a security slot body protruding from the strip body and having a thickened portion thicker than the thickness dimension of the strip body and defining therein a security slot in which a locking element of a locking device is receivable, the security slot body extending along the one of the side walls of the mobile device, the security strip including at least one cutout that enables the security strip to extend generally in line of one of the front and rear legs of the mobile device so that at least one of the front or rear legs is at least partially locatable in the at least one cutout in the strip.

Preferably, the security strip is sufficiently long to extend from the left side wall to the right side wall of the mobile device. The at least one cutout includes first and second cutouts. The security strip is configured to be mounted to an underside of said mobile device, closer to the front side as compared to the location of said front legs relative to said front side. Screw holes are formed through the thickness dimension of said security strip and said security strip being held to an underside of said mobile device by screws passing through the screw holes and screwed into the underside of the mobile device. The at least one cutout has a semicircular shape. The security slot has a cross-sectional, trapezoidal shape. The thickness dimension of the security strip is less than a height dimension associated with the front legs.

Preferably, the security slot has an opening that provides access into said slot, and said opening is rectangularly shaped and said thickened portion has a thickness substantially larger than the thickness of the strip body; and the security slot has a trapezoidal shape within, said trapezoidal shape of said slot being defined by first and second sidewalls which abut and define an opening into said slot and said sidewalls tapering away from each other as said sidewalls extend away from said opening. Two strips may be provided that extend in line with each other.

Other features and advantages of the present invention will become apparent from the following description of the invention which refers to the accompanying drawings.

DETAILED DESCRIPTION OF EMBODIMENTS OF THE INVENTION

Figure 10:
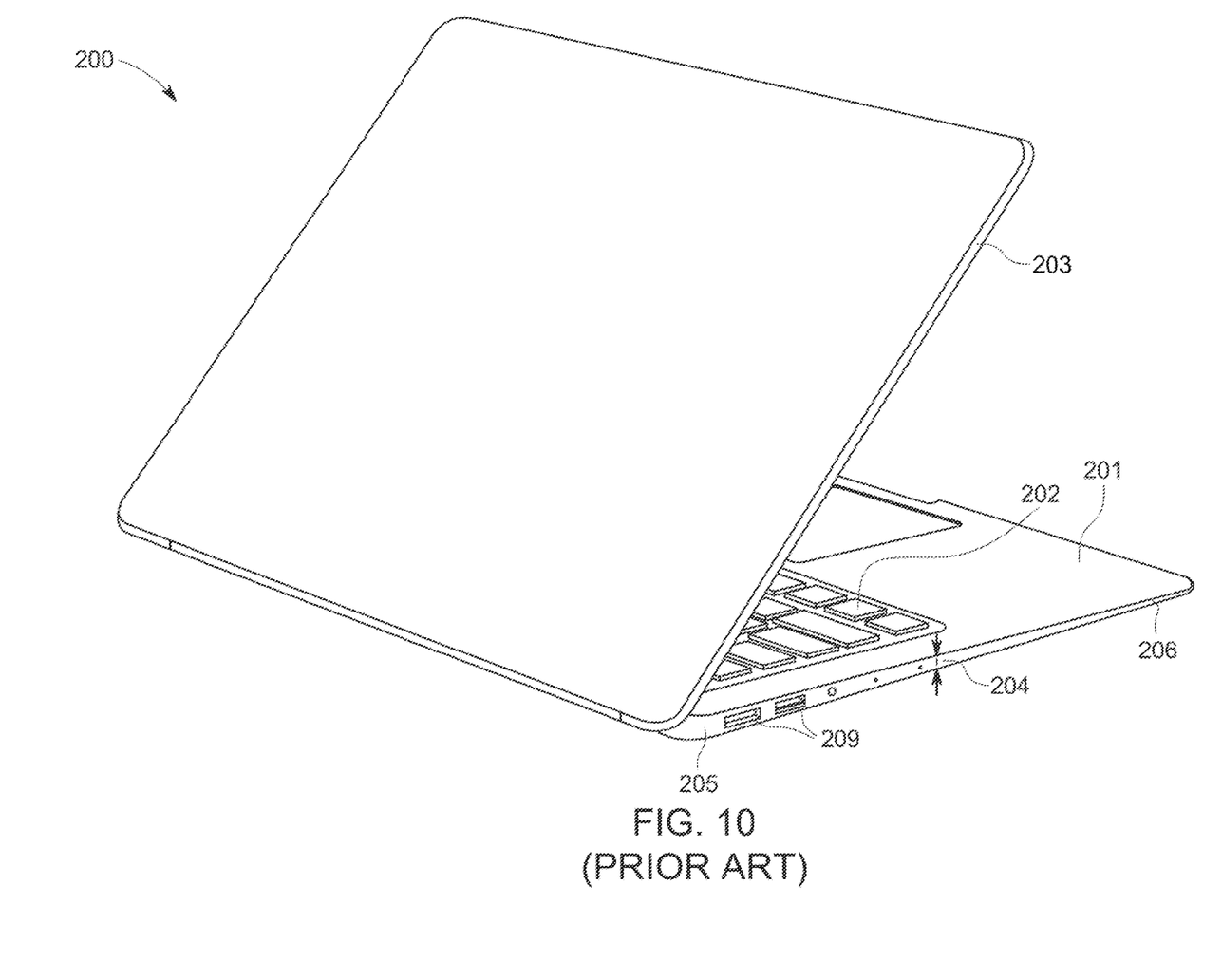
FIG. 10 (prior art) depicts a conventional laptop computer that is currently marketed by the Apple Corporation.
Figure 11:
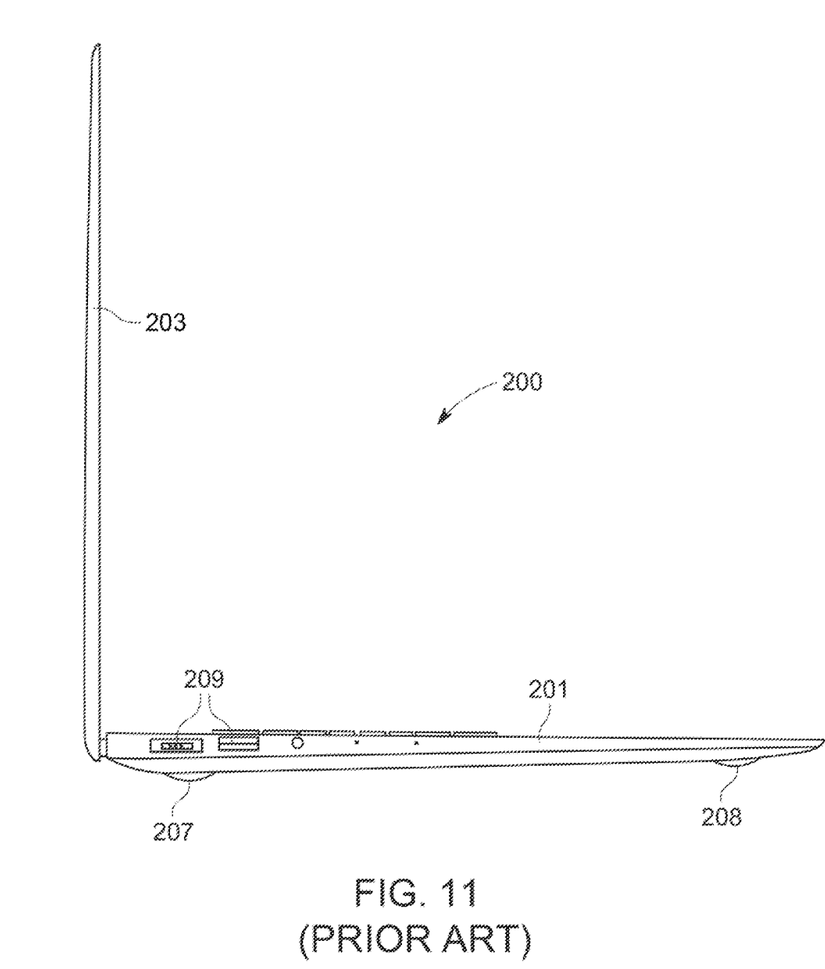
FIG. 11 (prior art) shows the laptop computer of FIG. 10 from another perspective.

In further development of the concept of providing security strips to laptop computers, reference is made to prior art FIGS. 10 and 11 which show a particular model of a laptop computer currently marketed by the Apple Corporation. Referring to FIG. 10, the laptop computer 200 has a main body 201 that supports a keyboard 202 and has a hingedly attached display 203. The thickness "t" 204 of the body 201 becomes progressively smaller (thinner) in a direction from the rear 205 to the front 206 of the body 201. The laptop body 201 includes various input/output devices 209.

Prior art FIG. 11 shows the same laptop computer 200, but also reveals that it has support cushions 207 and 208 on which the body 201 rests. These cushions 207 and 208 lift the laptop body 201 above a surface on which it rests.

Figure 12:
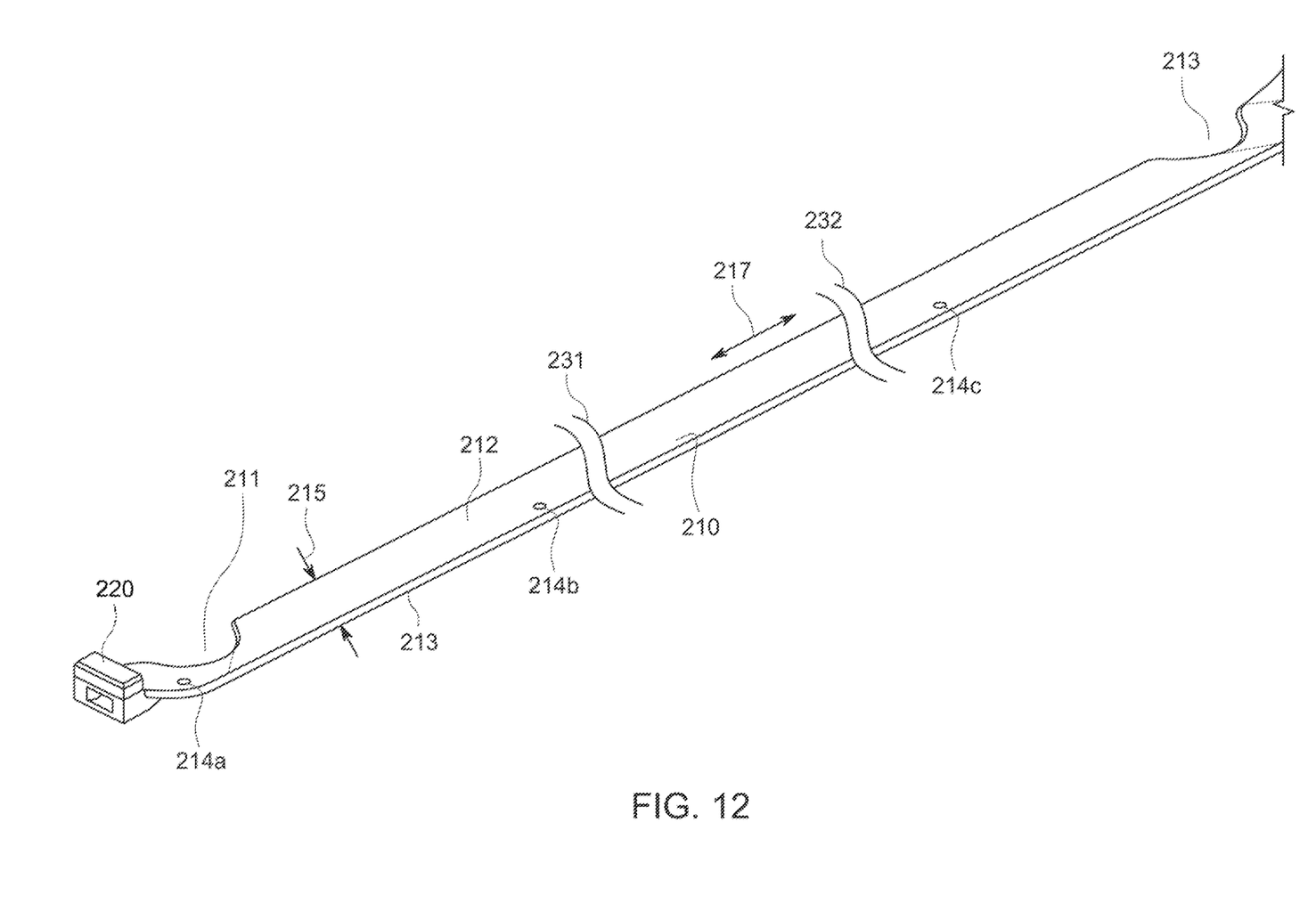
FIG. 12 is a perspective of a security strip attachable to electronic devices in accordance with the present invention.

Referring to FIG. 12, the novel security strip 210 of the present invention has a length dimension 217, a width dimension 215 and a thickness 213 substantially so that the thickness 213 is a small fraction of the length and width dimensions of the security strip 210. The security strip 210 also carries, adjacent its opposed ends, circular cutouts 211 and 213, which as shown below, are intended to enable locating therein the cushions 207 and 208 of the laptop 200. The screw holes 214a, 214b, 214c and another one (not shown) by which the strip 210 can be attached to the bottom of the laptop 200, enable firm attachment of the security strip 210 to the underside of the laptop 200 in a manner that makes it difficult to remove and walk off with the laptop computer.

As further shown in FIG. 12, at one distal end, a security slot 220, similar to the one shown in FIG. 2 above, enables connecting a security lock and a cable thereto preventing theft of the laptop 200.

Figure 13:
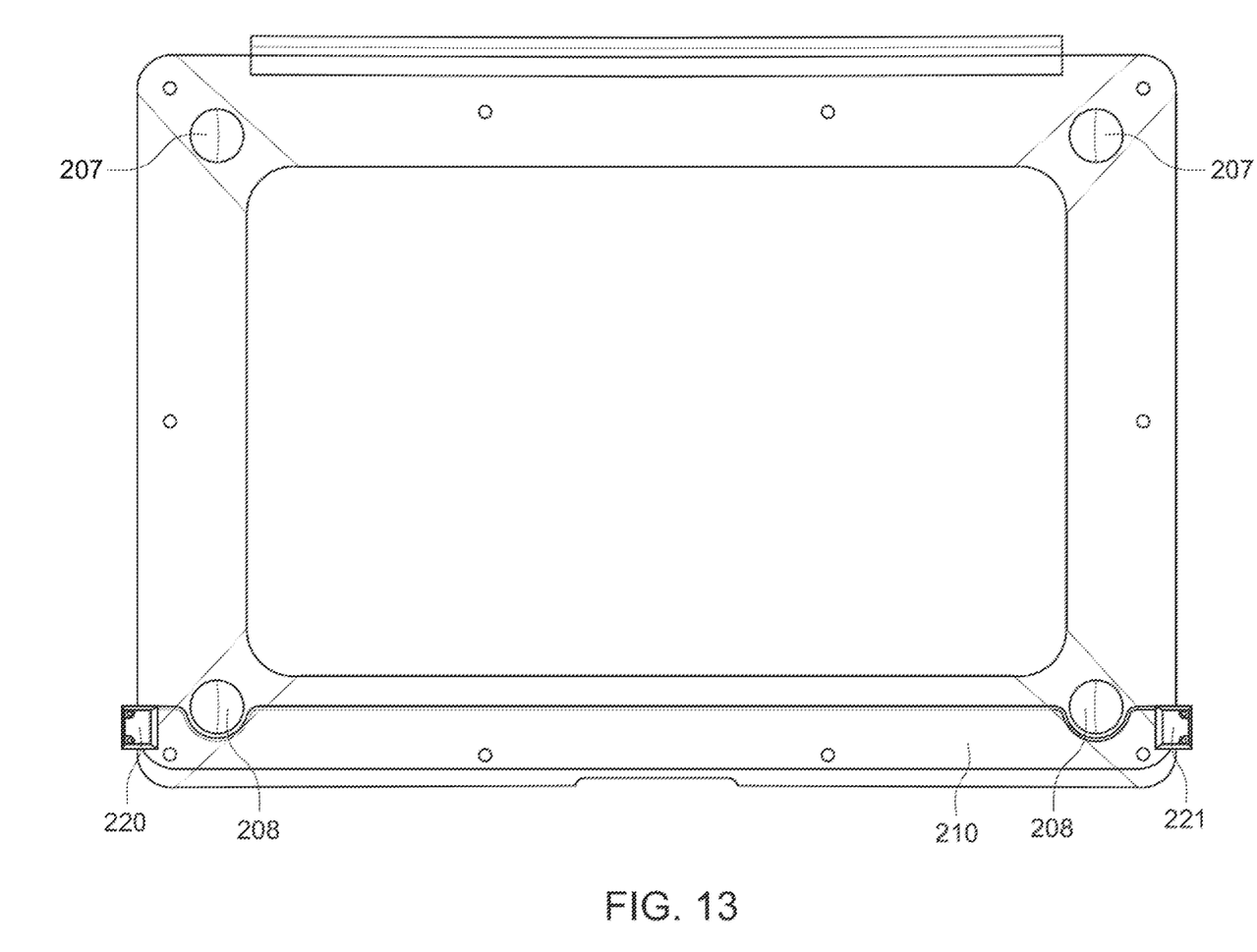
FIG. 13 shows the strip of FIG. 12 mounted to the rear of the laptop computer shown in FIG. 11.

As further shown in FIG. 13, the strip 210 is attached via screws to the underside of the laptop 200 with the cutouts 211 and 213 enabling fitting therein the cushions 208 at the left and right front side of the laptop. Thus, the strip has a thickness that is smaller than, but in any event, not larger than the thickness or extension of the cushions 208. An additional security strip 221 may also be provided at the opposed side, as shown.

Figure 14:
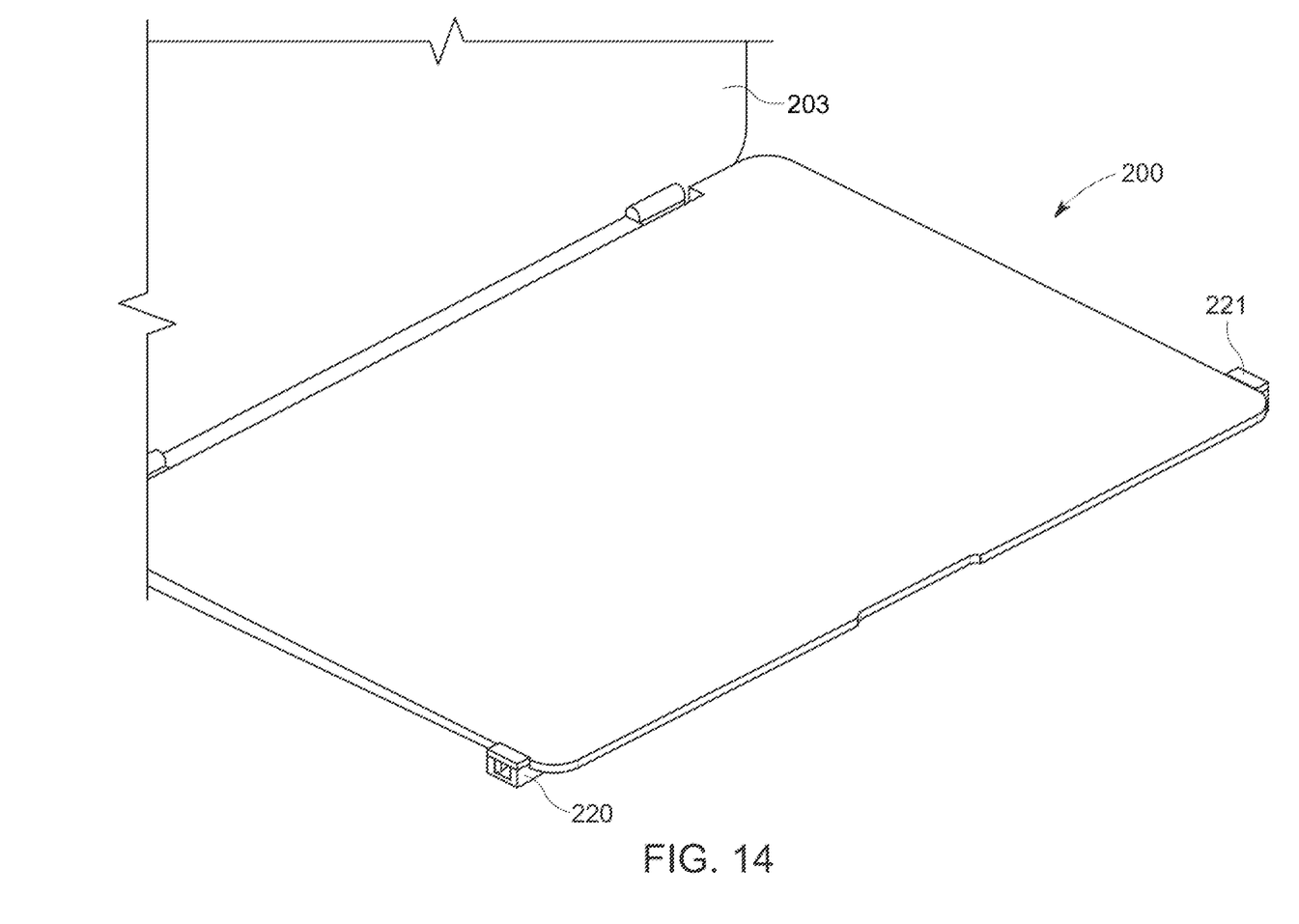
FIG. 14 is a further view showing the security strip attached to a laptop computer.

FIG. 14 shows the strip but only with the security slots 220 and 221 on the left and right sides at the front end of the laptop 200. Lastly, as indicated by the cut away lines 231 and 232, instead of a strip that has a length that reaches across the laptop, either a left or a right portion thereof may be provided, or both but separated from each other at the mid-section of the laptop.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A security strip, comprising: a security slot, the security strip being attachable to a mobile electronic device that has rear legs located adjacent a rear side of the mobile electronic device and front legs adjacent a front side thereof, the legs serving to elevate the mobile device above a resting surface thereof, the mobile device including a left sidewall and right side wall, the security strip further comprising:
 a strip body shaped as a flat and thin, strip-shaped component with a length, a width and a thickness dimension, wherein the length of the strip body is at least ten times the thickness dimension of the strip body;
 screw holes defined along the length of the strip body for enabling screwing the strip body to an underside of the mobile electronic device;
 a security slot body protruding from the strip body, the security slot body having a thickened portion thicker than the thickness dimension of the strip body and defining therein a security slot in which a locking element of a locking device is receivable, the security slot body extending along the one of the side walls of the mobile device,
 the security strip including at least one cutout that enables the security strip to extend generally in alignment with of one of the front and rear legs of the mobile device so that at least one of the front or rear legs is at least partially locatable in the at least one cutout in the strip.

2. The security strip of claim 1, wherein the security strip is sufficiently long to extend from the left side wall to the right side wall of the mobile device.

3. The security strip of claim 1, wherein said at least one cutout includes first and second cutouts.

4. The security strip of claim 1, wherein said security strip is configured to be mounted to an underside of said mobile device, closer to the front side as compared to the location of said front legs relative to said front side.

5. The security strip of claim 1, said screw holes being formed through the thickness dimension of said security strip and said security strip being attachable to an underside of said mobile device by screws passing through the screw holes and screwed into the underside of the mobile device.

6. The security strip of claim 1, wherein said at least one cutout has a semicircular shape.

7. The security strip of claim 1, wherein the security slot has a cross-sectional, trapezoidal shape.

8. The security strip of claim 1, wherein the thickness dimension of the security strip is less than a height dimension associated with the front legs.

9. The security strip of claim 1, wherein said security said security slot has an opening that provides access into said slot, and said opening is rectangularly shaped and said thickened portion has a thickness substantially larger than the thickness of the strip body; and
 wherein the security slot has a trapezoidal shape within, said trapezoidal shape of said slot being defined by first and second sidewalls which abut and define an opening into said slot and said sidewalls tapering away from each other as said sidewalls extend away from said opening.

10. The security strip of claim 1, in combination with the mobile device.

11. The security strip of claim 1, wherein the mobile device comprises a laptop computer.

* * * * *